United States Patent Office 3,423,346
Patented Jan. 21, 1969

3,423,346
LATEX COATING COMPOSITIONS
Howard C. Klauss and Ralph M. Brane, Pittsburgh, Pa., assignors to PPG Industries Inc., Pittsburgh, Pa., a corporation of Pennsylvania
No Drawing. Filed Oct. 19, 1965, Ser. No. 498,111
U.S. Cl. 260—22                 14 Claims
Int. Cl. C09d 5/02; C09d 3/76; C08g 39/10

ABSTRACT OF THE DISCLOSURE

Coating compositions suitable for use as the vehicle in latex house paints comprise a blend of an interpolymer of from 30 to 80 percent of vinyl chloride, from 2 to 60 percent of alkyl acrylate containing from 4 to 10 carbon atoms in the alkyl group, and from 2 to 40 percent by weight of vinylidene chloride, combined with an alkyd resin having a drying oil fatty acid ester content between 50 and 90 percent. A particularly useful surfactant composition for use in the above latex house paint includes from 3 to 12 parts of octylphenoxy polyethoxyethanol, from 1 to 5 parts of anionic dispersing agent and from 1 to 3 parts of potassium tripolyphosphate.

---

This invention relates to resinous compositions suitable for use as the vehicle in latex house paint and, more particularly, to such compositions comprising blends of an interpolymer of vinyl chloride and a long oil alkyd resin.

Latex or emulsion paints have been widely employed for architectural uses, especially for interior walls and the like. More recently, the advantages of such emulsion paints in reducing clean-up time and in ease of application have led to their increasing use for exterior work, as in painting houses and similar wood structures. When used for such purposes, vinyl polymers employed in latices provide good film properties, including resistance to weathering and similar characteristics.

In spite of these advantages, however, latex paints have suffered from a number of deficiencies which have seriously limited their use. One major drawback is the relatively poor adhesion of these paints to previously painted surfaces, this being particularly true when they are applied over surfaces which are glossy or which are chalky or otherwise in poor condition. This problem is especially troublesome because many buildings have some areas which are relatively exposed, and which thus quickly chalk and erode, and other surface areas which are protected and which retain their gloss for a long time. Thus, a good exterior house paint must have adequate adhesion to both types of surfaces, as well as to bare wood and other substrates, and this has been unattainable heretofore in a latex paint. Still another problem with latex paints is the inherent limitation on the amount of paint solids which can be incorporated in such compositions, which results in difficulty in providing sufficient coverage in a single coat.

On the other hand, the oleoresinous vehicles used in traditional house paints, such as oil modified alkyd resins, are relatively good in adhesion to various painted surfaces, but are otherwise undesirable in that they have poor long-term durability, such as poor color retention and resistance to ultraviolet light. Since, moreover, emulsions of such vehicles are relatively water sensitive and difficult to recoat, latex paints based thereon have not been satisfactory.

Attempts have been made to solve the foregoing problems by combining latices based on vinyl polymers with oleoresinous materials. However, it has been found that blends of ordinary latices, such as acrylic emulsions, with even small amounts of alkyds or other oleoresinous materials also have the poor color retention, susceptibility to grain cracking and tendency to chalk to which the alkyd-based paints themselves are subject. Furthermore, as the level of alkyd is increased in these formulations, these disadvantages are magnified. Similar problems have been encountered where vinyl acetate and similar emulsions have been combined with alkyd resins; in these cases, poor flexibility is a significant and undesirable characteristic of the paint film attained.

It has now been found that latex coating compositions having outstanding properties and essentially none of the disadvantages associated with known compositions of this type are provided by vehicles comprising a combination of a particular type of vinyl chloride interpolymer and an oil modified alkyd of relatively long oil length. For example, these paints provide coatings which not only retain the good color retention, durability and other properties of vinyl emulsion paints, and have good adhesion to various surfaces, but at the same time, these compositions unexpectedly avoid both the undesirable characteristics of ordinary latex paints and the disadvantageous properties ordinarily associated with the inclusion of alkyds in latices.

Thus, the paints of the invention have outstanding adhesion to both glossy and chalky repaint surfaces and can be applied at a high solids content and with a restricted spreading rate. They provide films which are flexible on substrates that are dimensionally unstable, and they have excellent color retention, resistance to ultraviolet degradation and resistance to dirt collection. In addition, the coating compositions as described herein have the package stability required for a commercially vendable paint for both industrial and domestic usage. That is, these compositions are stable at both elevated temperatures and when subjected to alternate freezing and thawing.

The vinyl chloride interpolymers employed in the compositions of the present invention are made by interpolymerizing a mixture of monomers comprising from about 30 percent to about 80 percent by weight of vinyl chloride, from about 2 percent to about 60 percent by weight of one or more alkyl acrylates containing from 4 to 10 carbon atoms in the alkyl group, and from about 2 percent to about 40 percent by weight of vinylidene chloride. Small amounts of other monomers, such as vinyl acetate, vinyl benzoate, diethyl maleate, acrylonitrile, methyl acrylate, ethyl acrylate, styrene, and others, can be included in the interpolymer, so long as their total amount is small in comparison with the remaining monomers, e.g., 10 percent or less. Generally, however, the inclusion of such other materials has not been found to provide sufficiently improved properties to warrant their inclusion.

The preferred alkyl acrylates employed in the interpolymers are alkyl esters of acrylic acid having 6 to 10 carbon atoms in the alkyl group. The acrylate most often used in 2-ethylhexyl acrylate, but others can be utilized including n-hexyl acrylate, n-heptyl acrylate, 1-methylheptyl acrylate, 3,5,5-trimethylhexyl acrylate, and n-octyl acrylate. Still others such as butyl acrylate and amyl acrylate, can be employed but are usually less desirable.

The interpolymer is prepared by polymerization in a conventional manner. Since it is to be utilized in an emulsion system, it is best to prepare the interpolymer in aqueous dispersion, using conventional emulsion techniques whereby a latex is obtained which is easily combined with other components of the coating composition. Methods of polymerizing these materials and a number of examples of interpolymers that can be employed, including several of those preferred in the invention, are described in U.S. Patent No. 2,563,079.

Examples of specific interpolymers which can be employed in the invention are produced as follows:

INTERPOLYMER A

A mixture of the following is charged into a reaction vessel:

| | Parts by weight |
|---|---|
| Vinyl chloride | 60.0 |
| Vinylidene chloride | 20.0 |
| 2-ethylhexyl acrylate | 20.0 |
| Potassium persulfate | 0.5 |
| Ammonia | 0.2 |
| Sodium lauryl sulfate | 4.0 |
| Water | 95.0 |

The mixture is agitated and heated to 50° C. and maintained at this temperature for 15 hours, whereupon there is obtained a latex containing 51.1 percent total solids.

INTERPOLYMER B

The procedure of Interpolymer A is repeated using the following polymerization mixture:

| | Parts by weight |
|---|---|
| Vinyl chloride | 60.0 |
| Vinylidene chloride | 20.0 |
| N-butyl acrylate | 20.0 |
| Potassium persulfate | 0.4 |
| Sodium bicarbonate | 0.1 |
| Sodium lauryl sulfate | 4.0 |
| Water | 90.0 |

The latex obtained has a total solids content of 52.5 percent.

INTERPOLYMER C

The following are charged into a reaction vessel:

| | Parts by weight |
|---|---|
| Vinyl chloride | 60.0 |
| Vinylidene chloride | 20.0 |
| 3,5,5-trimethylhexyl acrylate | 20.0 |
| Potassium persulfate | 0.5 |
| Ammonia | 0.2 |
| Sodium lauryl sulfate | 4.0 |
| Water | 95.0 |

The mixture is heated with agitation at 45° C. for 36 hours and produces a latex containing 51.1 percent total solids.

INTERPOLYMER D

Using the foregoing procedure, a mixture of 40 parts of vinyl chloride, 40 parts of vinylidene chloride and 20 parts of 2-ethylhexyl acrylate is interpolymerized at 45° C. for 15.5 hours. The product contains 52.7 percent solids.

The long oil alkyd resins employed in conjunction with the foregoing latices in the coating compositions herein have a drying oil fatty acid ester content between about 50 percent and about 90 percent by weight. Such alkyds may be made from any polyfunctional carboxylic acids, or anhydrides thereof, such as succinic acid, adipic acid, phthalic acid, tetrahydrophthalic acid, terephthalic acid, or isophthalic acid, and from various polyhydric alcohols, such as glycerin, pentaerythritol, sorbitol, mannitol, ethylene glycol, diethylene glycol, 2-3-butylene glycol, or the like. The preferred alkyds herein are made from pentaerythritol or a similar polyol and a phthalic acid, i.e., o-phthalic acid, isophthalic acid or terephthalic acid.

The fatty acid ester content of the alkyd is ordinarily derived by modification of the alkyd with a drying oil, although free fatty acids which are found in such oils can also be employed, in which case the fatty acids can be reacted with the polyhydric alcohol to form partial esters thereof, or the fatty acids can be reacted along with the other components during the preparation of the alkyd. The drying oils (or fatty acids derived therefrom) which are employed include soybean oil, safflower oil, linseed oil, perilla oil, tung oil, oiticica oil, poppyseed oil, tall oil, fish oil, and other drying oils having an iodine value of 90 or more, as measured by ASTM–D1467–57T (thus including the so-called "semi-drying oils").

The alkyds are made by conventional techniques employed in making such materials. Examples of specific alkyds which can be advantageously utilized in the invention are produced as follows:

ALKYD RESIN E

A vessel is charged with 4743 parts of soybean oil and 515 parts of pentaerythritol, and the mixture is heated to 445° F. There are added during the heating 1.3 parts of litharge. The mixture is maintained at reflux temperature until clear, and then 1050 parts of isophthalic acid and 276 parts of xylene are added. This mixture is refluxed at 420 to 430° F. for two hours, and then the temperature is slowly raised to 480° F. while removing some of the solvent, and maintained at this temperature for one hour. The product after cooling and filtering has a solids content of 98.4 percent and Gardner-Holt viscosity of Y to Z.

ALKYD RESIN F

A reaction vessel is charged with 4000 parts of soybean fatty acids, 1104 parts of pentaerythritol, and 920 parts of phthalic anhydride, along with 276 parts of xylene. The mixture is heated to about 460° F. over a six-hour period and maintained at this temperature for seven hours. The product has a solids content of 96.5 percent and a Gardner-Holt viscosity of Z+.

ALKYD RESIN G

The procedure employed in making Alkyd Resin E is repeated, except that linseed oil is used in place of soybean oil.

ALKYD RESIN H

The procedure employed in producing Alkyd Resin E is repeated, except that safflower oil is used in place of soybean oil.

The above are typical examples of alkyd resins that can be utilized in the invention, but others of the class described can also be utilized. The alkyds that can be employed include those which are modified with other materials, such as other monomers, such as styrene, or with an isocyanate. For instance, an organic isocyanate, such as toluene diisocyanate, can replace all or part of the carboxylic acid of the alkyd, producing a so-called urethane oil containing carbamic acid ester groups. These and other modified alkyd resins are among the alkyds that can be employed in the invention, provided they contain an overall fatty acid ester content within the range described above. An example of such a resin is made as follows:

ALKYD RESIN I

A mixture of 2780 parts of linseed oil, 145 parts of glycerol and 0.4 part of litharge is heated to 455° F. and held at that temperature for one hour. The mixture is then cooled to 158° F. and there are added 130 parts of toluene diisocyanate (80 percent 2,4-isomer, 20 percent 2,6-isomer). The temperature rises to 167° F. and then falls to 158° F., whereupon 130 parts of toluene diisocyanate are again added. When the temperature has again dropped, 0.9 part stannous octoate and 130 parts more of toluene diisocyanate are added and the mixture is heated to 200° F. for 6 hours. After cooling, 5 parts of ethanol are added and the mixture is filtered. The product has a solids content of about 100 percent and a hydroxyl value of 41.6.

It is important that the interpolymer of vinyl chloride and the alkyd resin be present in suitable proportions to provide the properties desired in the finished composition. Generally, the alkyd resins should be present in an amount between about 10 percent and about 75 percent of the total of the alkyd resin and the vinyl chloride interpolymer. (All ratios, parts and percentages herein are by weight and are based on resin solids content, unless otherwise specified.) A more preferred class of compositions contains from about 30 percent to 55 percent by weight of the alkyd resin.

The above materials are combined in the coating composition along with surface active agents and other additives to provide optimum properties in the finished composition. In order to provide maximum package stability on storage, it has been found desirable to include a specific surfactant system in the overall finished composition. This preferred surfactant system comprises three components in specified proportions, as follows:

| | Parts by weight |
|---|---|
| Octylphenoxy polyethoxyethanol | 3 to 12 |
| Anionic dispersing agent | 1 to 5 |
| Potassium tripolyphosphate | 1 to 3 |

The octylphenoxy polyethoxyethanol component of the surfactant system should have a molecular weight between about 400 and 2,000. The preferred octylphenoxy polyethoxyethanols can be depicted by the structure:

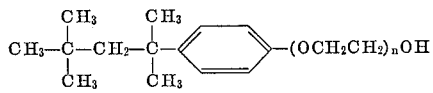

where $n$ is usually from about 5 to about 40.

The anionic dispersing agent employed can be any of the several materials of this type known in the art, but is preferably a sodium salt of a carboxylated polyelectrolyte, such as sodium polyacrylate.

The total amount of the surfactant system utilized is ordinarily between about 2 and about 15 percent by weight based upon the total amount of alkyd resin and vinyl chloride interpolymer in the composition.

The compositions herein are pigmented in the usual manner using conventional pigments of the type employed in emulsion paints for the intended use. The coating compositions herein are especially suitable for exterior house paints, and in this type of finish, titanium dioxide is one of the prime pigments generally employed, although others can also be utilized. Extender pigments, such as talc, calcium carbonate and the like, are usually also present. In most instances, the concentration of pigment by volume in the paint (PVC) is between about 15 percent and about 55 percent.

In producing the compositions herein, various techniques can be used. The alkyd resin can either be pre-emulsified and then combined with the vinyl chloride interpolymer latex or it can be dispersed in water along with pigments and suitable surfactants with agitation. The amount of agitation employed is such as to provide suitable particle size of the alkyd resin in the final composition. It is desirable that the alkyd emulsion have most of the particles of a size only slightly higher than those in ordinary latex paints known in the art; in the compositions made in accordance with the preferred practice of the invention herein, the particles of the alkyd resin have an average diameter between about 0.5 and about 3 microns. This is best accomplished by high speed agitation during emulsification, such as is provided by a Cowles Dissolver.

When the preferred surfactant system above is employed, the components are added during the preparation of the paint, along with other additive materials as desired, and the whole is thoroughly blended to provide the finished composition.

The method of producing the coating compositions of the invention, in its preferred embodiments, is illustrated by the following examples. These examples should not be construed to limit the invention to their details, but should be taken as illustrative of the preferred manner in which the compositions are produced in accordance with the invention. All parts and percentages in the examples, as throughout this specification, are by weight unless otherwise specified.

Example 1

This example shows the preparation of a white, exterior house paint.

The following are blended:

| | Parts by weight |
|---|---|
| Water | 60.0 |
| Octylphenoxy polyethoxy ethanol (mol. wt. 600–650) | 3.0 |
| Sodium polyacrylate | 9.0 |
| Defoamer (90% petroleum oil, 10% silica) | 5.0 |
| 2-amino-2-methyl 1-propanol | 5.5 |
| Ethylene glycol | 20.0 |

This mixture is agitated while adding the following in the order listed:

| | Parts by weight |
|---|---|
| Anatase titanium dioxide | 25.0 |
| Talc | 140.0 |
| Rutile titanium dioxide | 245.0 |

The mixture is blended on a Cowles Dissolver until smooth, and then 15 parts of water and 2 parts of potassium tripolyphosphate are blended in. While still mixing on the Cowles Dissolver, 100 parts of a 2½ percent solution of hydroxyethyl cellulose in water are added, along with 86 parts of Alkyd Resin E, 1.5 parts of lead naphthenate solution (24 percent lead in mineral spirits) 0.5 part of cobalt naphthenate solution (6 percent cobalt in mineral spirits), and 8 parts of phenyl mercury dodecyl succinate. After thorough mixing, the mixture is reduced with 60 parts of water.

The composition obtained above is agitated slowly while 260 parts of Interpolymer Latex A are added, along with 1 part of defoamer and 5 parts of octylphenoxy polyethoxy ethanol (both as above). When these are thoroughly blended, there are added, if required, sufficient water and aminomethyl propanol to bring the viscosity to between 75 and 80 KU (Kreb units) and the pH between 9.1 and 9.5.

When the above paint is coated on wood surfaces, either bare wood or previously painted surfaces, excellent coatings are obtained. For instance, in one series of tests, two coats were applied on new southern yellow pine siding and exposed to weathering at a 45° south angle of exposure for two years; the paint showed excellent resistance to grain cracking and dirt collection, and outstanding durability. In other tests, this composition was applied over previously painted exterior siding of residential homes without any primer or special surface preparation; excellent intercoat adhesion was obtained, with no peeling or cracking after more than two years, even when the surface coated was heavily chalked and in poor condition. Similar good results were obtained where the surface coated was glossy, e.g., under eaves and in other protected areas. In addition, the composition has good package stability, both at elevated temperatures and when subjected to alternate freezing and thawing.

Example 2

In this example, a tinting base paint suitable for tinting to desired colors is illustrated.

The materials below are mixed:

| | Parts by weight |
|---|---|
| Water | 140.0 |
| Octylphenoxy polyethoxy ethanol (mol. wt. 600–650) | 3.0 |
| Ethylene glycol | 20.0 |
| 2-amino-2-methyl-1-propanol | 4.5 |
| Sodium polyacrylate | 9.0 |
| Defoamer (as in Example 1) | 5.0 |

There are then added the following in the order listed:

| | Parts by weight |
|---|---|
| Rutile titanium dioxide | 180.0 |
| Diatomaceous silica | 50.0 |
| Mica | 30.0 |
| Calcium carbonate | 100.0 |

After mixing the foregoing until smooth on a Cowles Dissolver (10–15 minutes at 3500–4500 ft./min. peripheral speed), there are added 5 parts of water and 2 parts of potassium tripolyphosphate. Mixing is continued for five minutes and then the mixture is blended with 100 parts of hydroxyethyl cellulose solution (2½ percent in water), and 86 parts of Alkyd Resin F. The alkyd had been previously blended with 1.5 parts of lead naphthenate solution (24 percent lead in mineral spirits), 0.5 part of cobalt naphthenate solution (6 percent cobalt in mineral spirits) and 8 parts of phenyl mercury succinate. After reducing with 20 parts of water, the mixture is slowly agitated while adding 260 parts of Interpolymer Latex A, one part of the above defoamer, five parts of octylphenoxy polyethoxy ethanol and 80 parts of water. The resulting composition has a viscosity of 75 to 80 KU and a pH of 9.1 to 9.5, and has excellent package stability.

The composition when tested as described in Example 1 also had outstanding adhesion, durability, crack-resistance and similar properties. When tinted to various colors and tested, this composition also had excellent color-retention.

Other compositions of similar properties are produced by substituting other alkyd resins and vinyl chloride interpolymers, such as Interpolymer Latex B, C or D, and Alkyd Resins G, H or I, for the corresponding component in the above examples. In a similar manner, other vinyl chloride interpolymers and other alkyd resins, such as isocyanate-modified alkyds, can also be utilized in a corresponding manner.

According to the provisions of the patent statutes, there are described herein the invention and what are now considered to be its best embodiments. However, within the scope of the appended claims, it is to be understood that the invention can be practiced otherwise than as specifically described.

We claim:
1. A coating composition comprising a vehicle consisting essentially of
   (A) an interpolymer of monomers comprising from about 30 percent to about 80 percent by weight of vinyl chloride, from about 2 percent to about 60 percent by weight of alkyl acrylate containing between about 4 and about 10 carbon atoms in the alkyl group, and from about 2 percent to about 40 percent by weight of vinylidene chloride; and
   (B) from about 10 percent to about 75 percent by weight, based upon the total of (A) and (B) herein, of an alkyd resin having a drying oil fatty acid ester content between about 50 percent and about 90 percent by weight.

2. A water-dispersed coating composition comprising a vehicle in which the film-forming components are
   (A) an interpolymer of monomers comprising from about 30 percent to about 80 percent by weight of vinyl chloride, from about 2 percent to about 60 percent by weight of alkyl acrylate containing between about 4 and about 10 carbon atoms in the alkyl group, and from about 2 percent to about 40 percent by weight of vinylidene chloride; and
   (B) from about 10 percent to about 75 percent by weight, based upon the total of (A) and (B) herein, of an alkyd resin having a drying oil fatty acid ester content between about 50 percent and about 90 percent by weight.

3. The composition of claim 2 in which the alkyl acrylate has from 6 to 10 carbon atoms in the alkyl group.
4. The composition of claim 3 in which the alkyl acrylate is 2-ethylhexyl acrylate.
5. The composition of claim 2 in which said alkyd resin is a soybean oil-modified reaction product of pentaerythritol and a phthalic acid.
6. The composition of claim 2 in which said alkyd resin is a linseed oil-modified reaction product of pentaerythritol and a phthalic acid.
7. The composition of claim 2 in which said alkyd resin is a safflower oil-modified reaction product of pentaerythritol and a phthalic acid.
8. The composition of claim 2 in which said alkyd resin contains carbamic acid ester groups derived from an organic isocyanate.
9. The composition of claim 2 in which said composition contains as an additional component from about 2 percent to about 15 percent by weight, based on the total weight of interpolymer and alkyd resin, of a surfactant composition comprising
   (1) from about 3 to about 12 parts by weight of an octylphenoxy polyethoxyethanol having a molecular weight between about 400 and about 2,000;
   (2) from about 1 to about 5 parts by weight of an anionic dispersing agent, and
   (3) from about 1 to about 3 parts by weight of potassium tripolyphosphate.
10. The composition of claim 9 in which said anionic dispersing agent is a sodium salt of a carboxylated polyelectrolyte.
11. The composition of claim 9 in which said anionic dispersing agent is sodium polyacrylate.
12. The composition of claim 9 in which the alkyd resin particles have an average diameter between about 0.5 and about 3 microns.
13. A latex comprising water and dispersed therein pigment and a vehicle in which the film-forming components are
   (A) an interpolymer of monomers comprising about 60 percent of vinyl chloride, about 20 percent of 2-ethylhexyl acrylate, and about 20 percent of vinylidene chloride, and
   (B) from about 30 percent to about 55 percent by weight, based on the total of (A) and (B) herein, of an oil modified alkyd resin having a total fatty acid ester content between about 50 percent and about 90 percent by weight.
14. The latex of claim 13 in which said alkyd resin is a soybean oil-modified reaction product of pentaerythritol and isophthalic acid.

References Cited
UNITED STATES PATENTS

| | | | |
|---|---|---|---|
| 2,563,079 | 8/1951 | Smith | 260—80.77 |
| 2,605,257 | 7/1952 | Wolf et al. | 260—80.77 |
| 2,606,162 | 8/1952 | Coffey et al. | 260—22 |
| 2,651,626 | 9/1953 | De Nie | 260—80.77 |
| 2,671,063 | 3/1954 | Waldie | 260—22 |
| 2,825,708 | 3/1958 | Auer | 260—22 |
| 3,077,459 | 2/1963 | Hershey et al. | 260—29.2 |
| 3,258,438 | 6/1966 | Shaw et al. | 260—22 |

DONALD E. CZAJA, *Primary Examiner.*

R. W. GRIFFIN, *Assistant Examiner.*

U.S. Cl. X.R.

260—23, 29.6, 30.6, 32.2, 32.6, 33.6, 40, 41, 80.77; 117—148, 167